US011267385B2

(12) United States Patent
Kuriyagawa et al.

(10) Patent No.: US 11,267,385 B2
(45) Date of Patent: Mar. 8, 2022

(54) WORK EQUIPMENT

(71) Applicant: HONDA MOTOR CO., LTD., Tokyo (JP)

(72) Inventors: Koji Kuriyagawa, Wako (JP); Runa Kaneko, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 299 days.

(21) Appl. No.: 16/472,110

(22) PCT Filed: Dec. 13, 2017

(86) PCT No.: PCT/JP2017/044649
§ 371 (c)(1),
(2) Date: Jun. 20, 2019

(87) PCT Pub. No.: WO2018/123580
PCT Pub. Date: Jul. 5, 2018

(65) Prior Publication Data
US 2020/0122623 A1    Apr. 23, 2020

(30) Foreign Application Priority Data

Dec. 26, 2016 (JP) .............................. JP2016-252088

(51) Int. Cl.
*B60P 1/04* (2006.01)
*A01D 43/073* (2006.01)
(Continued)

(52) U.S. Cl.
CPC ............ *B60P 1/045* (2013.01); *A01D 43/073* (2013.01); *B60P 1/283* (2013.01); *B60P 3/00* (2013.01);
(Continued)

(58) Field of Classification Search
CPC ...... B60P 1/14; B60P 1/18; B60P 1/08; B60P 1/04; B60P 1/06; B60P 1/12; B60P 1/045;
(Continued)

(56) References Cited

U.S. PATENT DOCUMENTS 3,193,330 A * 7/1965 Hribar, Jr. ................. B60P 1/16
298/8 R
4,596,347 A * 6/1986 Hite .................... B62D 49/0671
224/280
(Continued)

FOREIGN PATENT DOCUMENTS

EP         2172364 A2      4/2010
JP         H04-283136      10/1992
(Continued)

OTHER PUBLICATIONS

European Search Report dated Nov. 18, 2019, 7 pages.
International Search Report, 2 pages.

*Primary Examiner* — D Glenn Dayoan
*Assistant Examiner* — Sunsurraye Westbrook
(74) *Attorney, Agent, or Firm* — Rankin, Hill & Clark LLP

(57) ABSTRACT

Work equipment configured to unload a collected article from the storage container and resistant to tipping over when unloading the collected article. The work equipment includes a vehicle body; a storage container provided on the vehicle body so as to be moveable between a horizontal position for storing a collected article and an inclined position for unloading the collected article; a drive unit provided between the vehicle body and the storage container and configured to change a container inclination angle defined as an angle of the storage container with respect to the vehicle body; an inclination angle sensor detecting a vehicle body inclination angle defined as an inclination angle of the vehicle body with respect to a horizontal plane;
(Continued)

and a control unit configured to control a driving operation of the drive unit according to the vehicle body inclination angle.

14 Claims, 11 Drawing Sheets

(51) Int. Cl.
  *B60P 1/28* (2006.01)
  *B60P 3/00* (2006.01)
  *G01C 9/00* (2006.01)
  *A01D 34/64* (2006.01)
  *A01D 101/00* (2006.01)

(52) U.S. Cl.
  CPC ............... *G01C 9/00* (2013.01); *A01D 34/64* (2013.01); *A01D 2101/00* (2013.01)

(58) Field of Classification Search
  CPC .... B60P 1/162; B60P 1/24; B60P 1/32; B60P 3/1033
  USPC .... 298/22 C, 5, 17 R, 15, 23 R, 38, 10, 1 R, 298/17.5, 17.6, 19 R, 19 V, 2
  See application file for complete search history.

(56) References Cited

U.S. PATENT DOCUMENTS

| 5,742,228 A | 4/1998 | Levy |
| 10,654,392 B2 * | 5/2020 | Danner .................... B60P 1/28 |
| 2008/0208416 A1 | 8/2008 | Yuet et al. |
| 2011/0150615 A1 | 6/2011 | Ishii |
| 2014/0336883 A1 | 11/2014 | Thompson et al. |

FOREIGN PATENT DOCUMENTS

| JP | H09-104279 | 4/1997 |
| JP | 2003-189718 | 7/2003 |
| JP | 2005-021129 | 1/2005 |
| JP | 2008-213685 | 9/2008 |
| JP | 2009-000016 | 1/2009 |
| JP | 2009-005660 | 1/2009 |
| JP | 2001-105954 | 4/2011 |
| JP | 2015-092845 | 5/2015 |
| JP | 2016-187979 | 11/2016 |
| WO | 2009/087795 | 7/2009 |

* cited by examiner

WORK EQUIPMENT

TECHNICAL FIELD

The present invention relates to a work equipment, and more particularly to a work equipment such as a lawn mower.

BACKGROUND ART

In a known lawn mower, a storage container for storing cut grass clippings is tiltably attached to a machine main body so that the cut grass clippings may be unloaded from the storage container by tilting the storage container (for example, Patent Documents 1 and 2).

PRIOR ART DOCUMENT(S)

Patent Document(s)

Patent Document 1: JP2003-189718A
Patent Document 2: JP2015-92845A

SUMMARY OF THE INVENTION

Task to be Accomplished by the Invention

In such lawn mowers, when unloading grass clippings, if the balance of weight is lost, the lawn mower may tip over. When the ground is inclined, there is a greater chance of losing weight balance, and the tendency of the lawn mower to tip over when unloading grass clippings increases.

Further, if the lawn mower is provided with a self-propelled container device having a storage container so that the container device is enabled to travel to a designated location to unload the grass clippings, the disposal of the grass clippings can be simplified. Since the self-propelled container device is significantly lighter in weight than the machine main body, the container device may easily tip over when tilting the storage container to discharge the grass clippings.

In view of such a problem of the prior art, a primary object of the present invention is to provide work equipment configured to unload a collected article from the storage container and resistant to tipping over when unloading the collected article.

Means to Accomplish the Task

To achieve such an object, the present invention provides work equipment, comprising: a vehicle body (72); a storage container (88) provided on the vehicle body so as to be moveable between a horizontal position for storing a collected article and an inclined position for unloading the collected article; a drive unit (98) provided between the vehicle body and the storage container and configured to change a container inclination angle defined as an angle of the storage container with respect to the vehicle body; an inclination angle sensor (108) detecting a vehicle body inclination angle defined as an inclination angle of the vehicle body with respect to a horizontal plane; and a control unit configured to control a driving operation of the drive unit, the control unit controlling the drive unit according to the vehicle body inclination angle.

Since the driving operation of the drive unit is controlled according to the inclination angle of the ground surface, the work equipment is prevented from tipping over.

In this arrangement, preferably, the control unit prohibits the driving operation of the drive unit when the vehicle body inclination angle is equal to or greater than a first inclination angle determination value.

Since the drive unit is prohibited from performing the driving operation on a slope where the work equipment could tip over when the drive unit performs the driving operation, the work equipment is prevented from tipping over.

In this arrangement, preferably, the control unit changes a driving speed of the drive unit in dependence on the vehicle body inclination angle.

Since the moving speed of the storage container can be changed in dependence on the vehicle body inclination angle, the work equipment is prevented from tipping over.

In this arrangement, preferably, when the vehicle body inclination angle is smaller than a second inclination angle determination value smaller than the first inclination angle determination value, the control unit sets the driving speed of the drive unit to a predetermined first driving speed, and when the vehicle body inclination angle is equal to or greater than the second inclination angle determination value and smaller than the first inclination angle determination value, the control unit sets the driving speed of the drive unit to a predetermined second driving speed lower than the first driving speed.

Thereby, the storage container moves at a lower speed on a steep slope than on a less steep slope so that the work equipment is less prone to tipping over. Furthermore, since the storage container moves faster relative to a machine main body on a less steep slope than on a steep slope, the unloading of the collected article can be accomplished in a shorter period of time.

In this arrangement, preferably, when the drive unit is performing the driving operation to increase the container inclination angle, and a time change rate of the vehicle body inclination angle exceeds a predetermined threshold value, the control unit prohibits the driving operation of the drive unit.

Since the drive unit is prevented from performing the driving operation when the time change rate of the vehicle body inclination angle changes or when the work equipment is on an unstable slope, the power equipment is prevented from tipping over.

In this arrangement, preferably, when the drive unit is performing the driving operation to increase the container inclination angle, and a time change rate of the vehicle body inclination angle exceeds a predetermined threshold value, the control unit causes the drive unit to decrease the container inclination angle.

Thereby, when the time change rate of the vehicle body inclination angle changes or when the work equipment is on an unstable slope, and the work equipment is about to tip over due to the driving operation of the drive unit, the drive unit reverses the driving operation thereof so that the storage container is moved back toward the original position. As a result, the work equipment is prevented from tipping over.

In this arrangement, preferably, when the drive unit is performing the driving operation to increase the container inclination angle, and a time change rate of the vehicle body inclination angle exceeds a predetermined threshold value, the control unit causes the drive unit to decrease the container inclination angle at a driving speed equal to or lower than the first driving speed.

When the work equipment is about to tip over on an unstable slope due to the driving operation of the drive unit, and the drive unit is driven in the reverse direction, the container is displaced or moved at a lower speed than on a slope with a smaller inclination so that the work equipment is prevented from tipping over.

In this arrangement, preferably, when the control unit causes the drive unit to perform the driving operation so as to decrease the container inclination angle following an event where the time change rate of the vehicle body inclination angle has exceeded the predetermined threshold value, the control unit causes the drive unit to perform the driving operation so as to increase the container inclination angle upon the vehicle body inclination angle becoming equal to or smaller than the first inclination angle determination value.

Once the vehicle body of the work equipment is stabilized by the drive unit performing the driving operation in the direction to decrease the container inclination angle following the event where the work equipment was about to tip over on the unstable slope, the container can be tilted to such an extent that the collected article can be favorably unloaded.

In this arrangement, preferably, when the vehicle body inclination angle is equal to or smaller than the first inclination angle determination angle, the control unit causes the drive unit to perform the driving operation until the container inclination angle has become equal to a prescribed angle.

Thereby, when the work equipment is on a slope which is unlikely to cause the work equipment to tip over, the collected article can be unloaded in a favorable manner.

In this arrangement, preferably, when the control unit causes the drive unit to perform the driving operation so as to decrease the container inclination angle following an event where the storage container has been moved to the inclined position, the control unit causes the drive unit to perform the driving operation at a maximum speed.

Thereby, the time period that is required for the container to be restored from the tilted position to the horizontal position can be reduced so that the collected article can be unloaded in a shorter period of time.

In this arrangement, preferably, the vehicle body inclination angle comprises a fore and aft inclination angle defined as an angle in a fore and aft direction of the vehicle body relative to a horizontal plane, and a lateral inclination angle defined as an angle in a lateral direction relative to the horizontal plane.

Thereby, the vehicle body inclination angle can be acquired with ease, and the process executed by the control unit can be simplified.

In this arrangement, preferably, the vehicle body inclination angle comprises an inclination angle defined as an angle in a tilting direction of the storage container tilted by the drive unit relative to a horizontal plane of the vehicle body.

Thereby, the shifting of the gravitational center can be detected with ease so that the process executed by the control unit can be simplified.

Effect of the Invention

The present invention thus provides work equipment that is configured to unload a collected article in a storage container by tilting the storage container, and is resistant to tipping over when unloading the collected article.

BRIEF DESCRIPTION OF THE DRAWING(S)

MODE(S) FOR CARRYING OUT THE INVENTION

Work equipment according to an embodiment of the present invention in the form of a riding lawn mower is described in the following with reference to FIGS. 1 to 11.

The riding lawn mower 10 includes a machine main body 20 and a grass (collected article) container device 70 detachably connected to a rear end of the machine main body 20.

Figure 1:
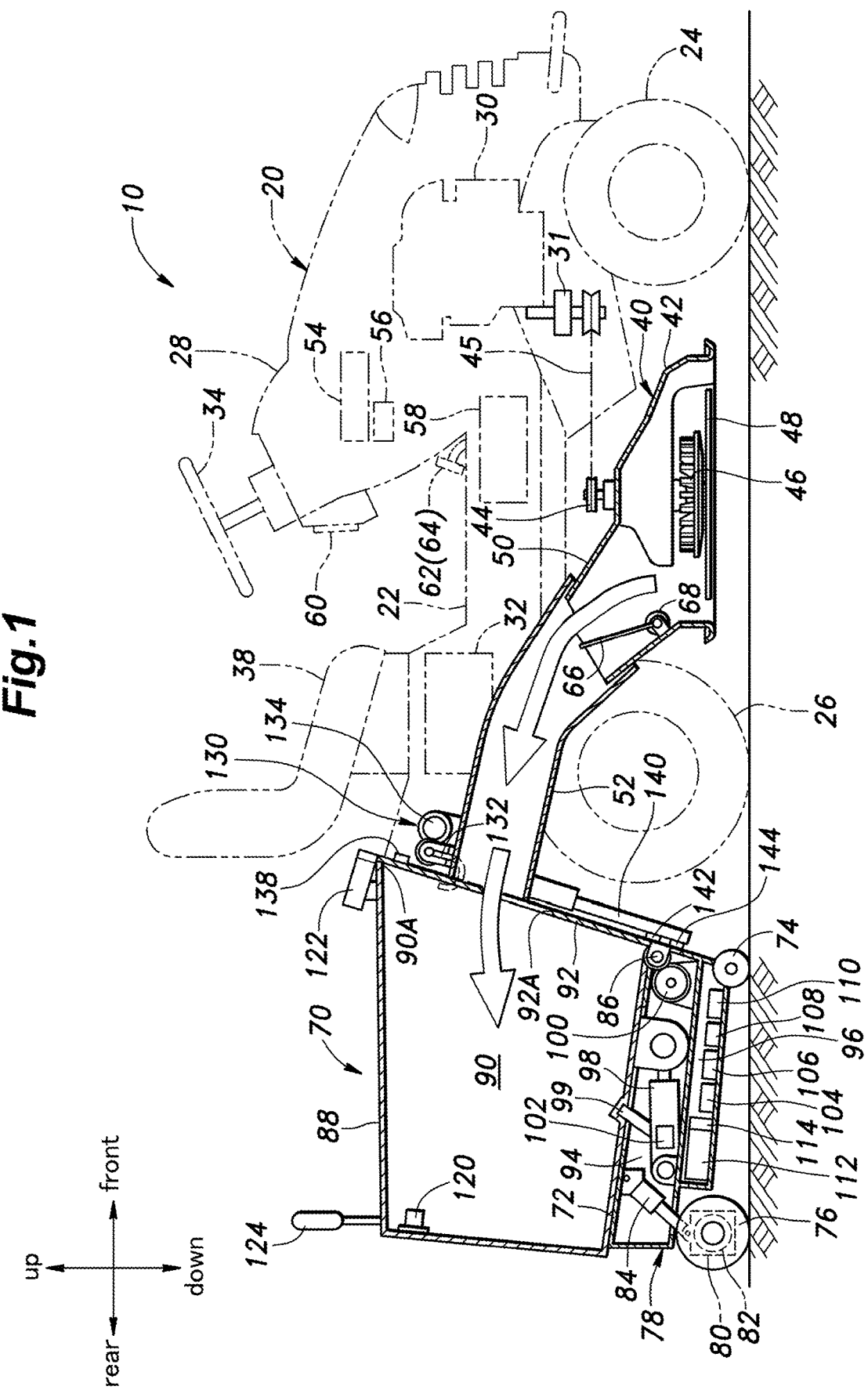
FIG. 1 is a sectional side view of work equipment in the form of a riding lawn mower according an embodiment of the present invention (a sectional side view when a container device for storing grass clippings is lowered)
Figure 2:
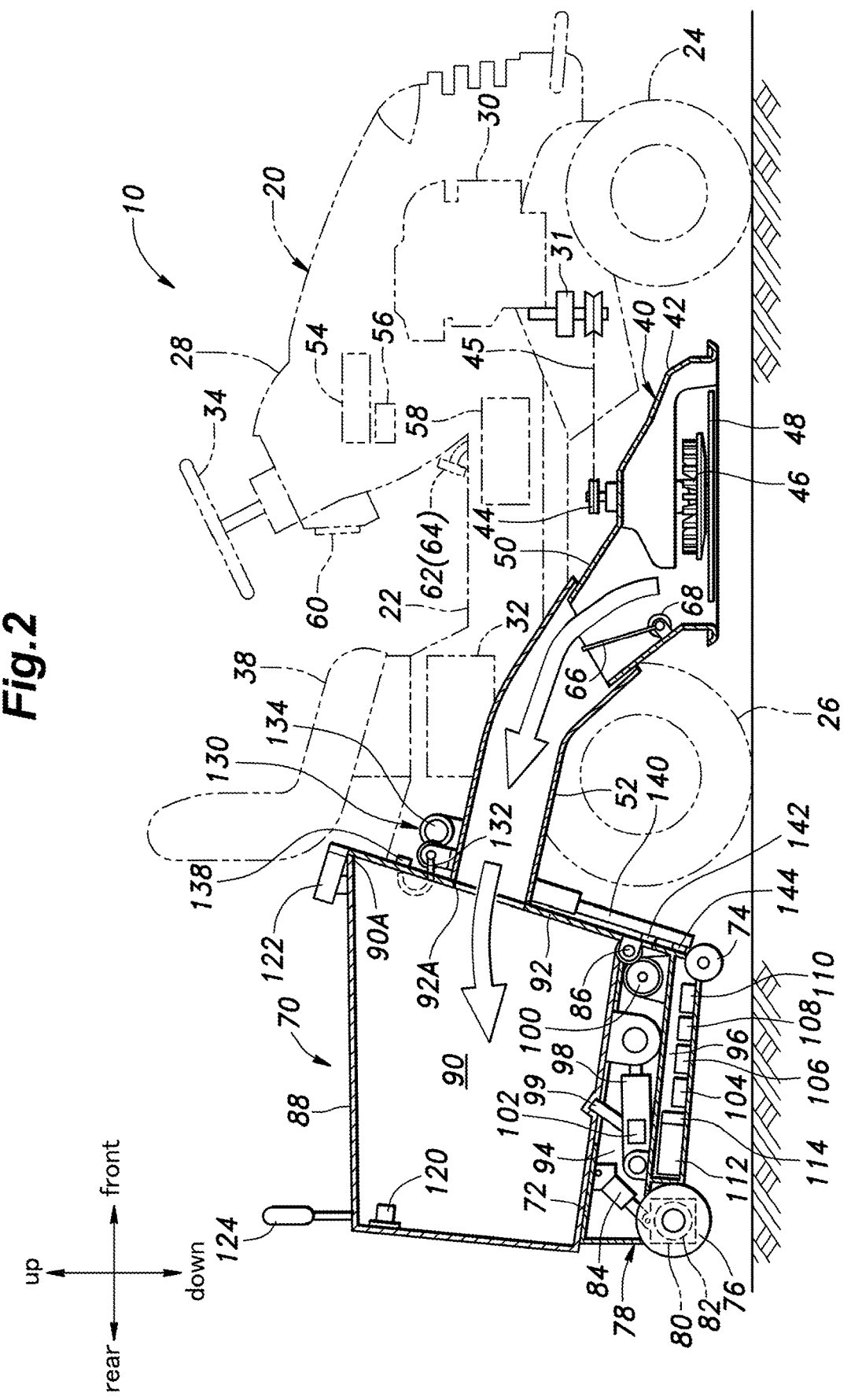
FIG. 2 is a sectional side view of the riding lawn mower according to the present embodiment (a sectional side view when the container device is lifted)

As shown in FIG. 1 and FIG. 2, a machine main body 20 is provided with a main frame 22 (a first structural body), a pair of front wheels 24 and a pair of rear wheels 26 provided on the main frame 22 (a first travel unit), a front vehicle body 28 provided in a front part of the main frame 22, an internal combustion engine 30 provided in the front vehicle body 28, a fuel supply unit 32 (a first energy source) including a fuel tank for storing fuel for the internal combustion engine 30 and a fuel pump provided in the main frame 22, a steering wheel 34 provided in the front vehicle body 28, and a driver's seat 39 provided on the front vehicle body 28. The internal combustion engine 30 rotatively drives not only the front wheels 24 but also a fan 46 and a cutting blade 48.

The traveling and braking of the machine main body 20 are controlled by the driver (operator) in the same manner as a conventional riding lawn mower by the operation of an accelerator pedal 62 and a brake pedal 64 provided on the main frame 22.

In a lower part of the main frame 22 is provided a work unit consisting of a cutting blade device (a collection device) 40 in the present embodiment. The cutting blade device 40 includes a housing 42 having an opening facing downward, a blower fan 46 and a cutting blade 48 which are positioned in the housing 42, and fitted on a vertical rotary shaft 44. The rotary shaft 44 is connected to the internal combustion engine 30 via a belt transmission mechanism 45 and a clutch 31 in a power transmitting manner, and is rotatively driven by the internal combustion engine 30 in a selective manner. The housing 42 is provided with a discharge duct 50 for discharging mowed grass clippings. The main frame 22 has a connection duct 52 for connecting the discharge duct 50 to a grass receiving chamber 90 of a container device 70 which will be described hereinafter.

The discharge duct 50 is provided with a shutter 66 for changing the direction of the mowed grass clippings thrown toward the connection duct 52 by the air flow created by the cutting blade 48 and the fan 46, and an electric shutter actuator 68 for changing the angle of the shutter 66.

The machine main body 20 further includes a main body control unit 54 consisting of an electronic control device provided in the front vehicle body 28, a wireless communication unit 56 also provided in the front vehicle body 28 for performing wireless communication with the container device 70, a rechargeable battery 58 provided in the main frame 22, and an operation unit 60 (display unit) provided in the front vehicle body 28. The operation unit 60 may include a LCD panel and a touch panel, or may include switches or the likes, and includes a dump execution button (not shown in the drawings) for dumping or otherwise unloading mowed grass clippings as will be described hereinafter. The battery 58 is charged by a generator (not shown in the drawings) driven by the internal combustion engine 30.

Figure 3:
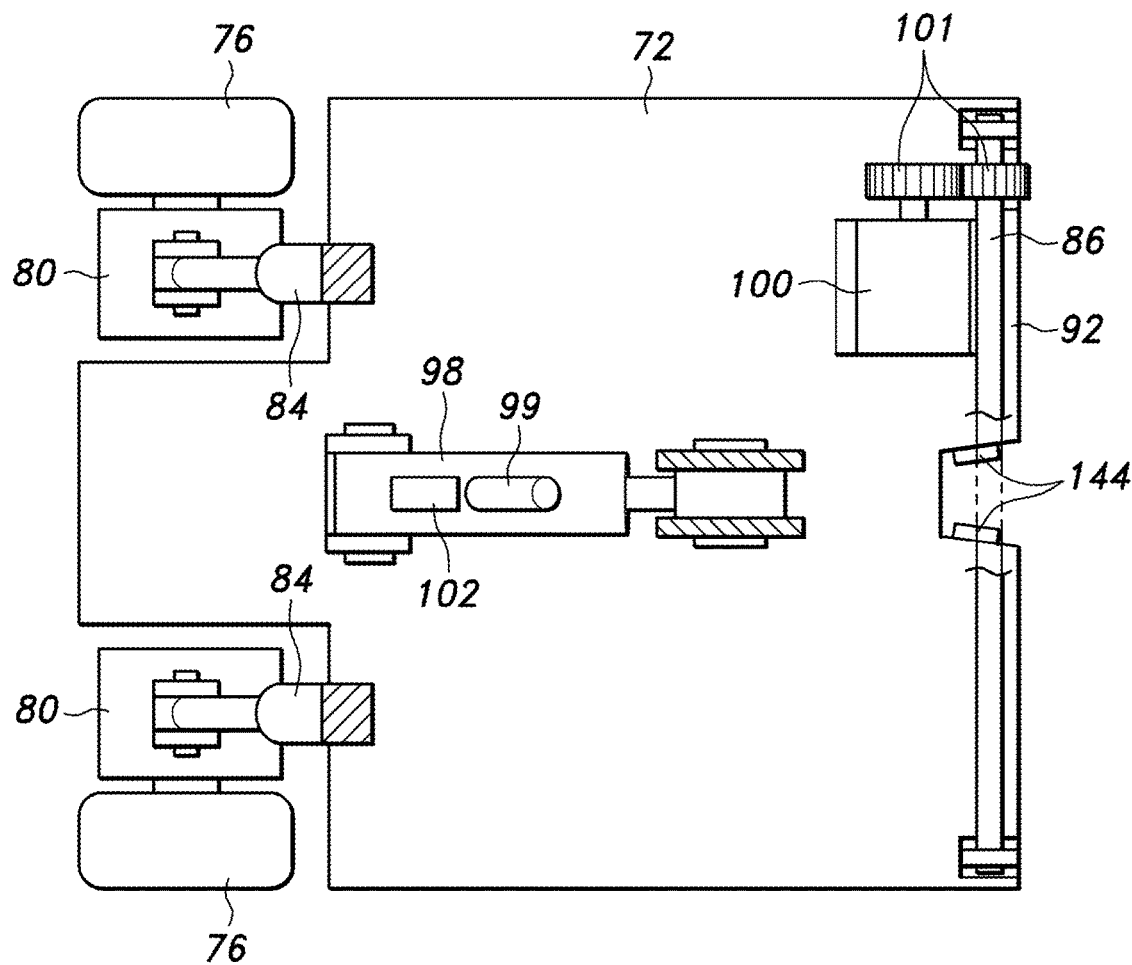
FIG. 3 is a plan view of a machine chamber of the container device of the riding lawn mower according to the present embodiment.

As shown in FIGS. 1 to 3, the container device 70 is provided with an undercarriage 78 including a device frame 72, and a pair of front wheels 74 and a pair of rear wheels 76 supported by the device frame 72, and a travel drive unit 80 (a second travel unit) including electric motors for individually rotatively driving the right and left rear wheels 76. The travel drive unit 80 is attached to the device frame 72 via a rear wheel lifting actuator 84 (lift actuator) consisting of an electric linear actuator so that the rear wheels 76 can be moved between a lifted position where the rear wheels are raised from the ground surface and a lowered position where the rear wheels 76 are in contact with the ground surface by the extension and retraction of the rear wheel lifting actuator 84.

The device frame 72 supports a grass storage container 88 so as to be tiltable (dumping operation) around a support shaft 86 extending laterally in a front part of the device frame 72.

The grass storage container 88 has a substantially rectangular box shape defining a grass receiving chamber 90 for receiving the mowed grass clippings (collected article) from the cutting blade device 40, and is provided with a content discharge opening 90A extending over an entire front area thereof. The support shaft 86 is fitted with a gate plate 92 so that the gate plate 92 opens and closes the content discharge opening 90A as the support shaft 86 rotates. The grass storage container 88 and the gate plate 92 have a common center line of rotation (tilting movement) provided by the support shaft 86.

Thus, the structural body (a second structural body) of the container device 70 thus includes the device frame 72, the grass storage container 88 and the gate plate 92.

Figure 4:
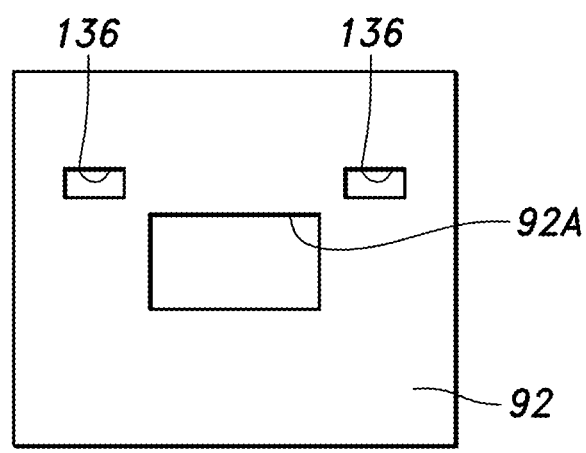
FIG. 4 is a front view of a gate plate of the riding lawn mower according to the present embodiment.

As shown in FIG. 4, the gate plate 92 is formed with a grass inlet opening 92A. As shown in FIG. 2, when the container device 70 connected to the machine main body 20 is in the lifted position, the grass inlet opening 92A aligns with the outlet of the connection duct 52. In addition, the grass storage container 88 is provided with an exhaust region (not shown in the drawings) which allows air to pass through, but does not allow the grass to pass through.

A pressure sensor (collected article detection sensor) 120 is provided in the grass storage container 88 for detecting the internal pressure of the grass receiving chamber 90 in order to detect the amount of the mowed grass clippings stored in the grass receiving chamber 90. An upper part of the grass storage container 88 is provided with a camera 122 serving as an environment sensor for detecting the environment surrounding the container device 70 and a warning unit 124 including a red lamp or the like.

The device frame 72 defines a machine chamber 94 and an electric chamber 96 one above the other. The machine chamber 94 accommodates therein a dump actuator 98 for tilting the grass storage container 88 and a gate actuator 100 for opening and closing the gate plate 92 provided in a bottom part of the grass storage container 88. The dump actuator 98 is provided with a dump angle sensor 102 for detecting an inclination angle (dump angle) of the grass storage container 88 with respect to the device frame 72 from the operating state of the dump actuator 98.

The dump actuator 98 is formed by an electric linear actuator, and tilts the grass storage container 88 between a horizontal position where the bottom surface of the grass storage container 88 lay flat on the upper surface of the device frame 72 substantially horizontally as shown in FIG. 1, and a tilted position where the grass storage container 88 is tilted from the horizontal position around the central axial line of the support shaft 86 in clockwise direction to a rear end up posture. The dump actuator 98 is provided with a stopper 99 that abuts against the grass storage container 88 when the grass storage container 88 is in the horizontal posture.

The gate actuator 100 is formed by an electric motor, and is connected to the support shaft 86 via a gear train 101 in a power transmitting relationship. The gate actuator 100 rotates the gate plate 92 between a closed position (see FIGS. 1 and 5) for closing the content discharge opening 90A and an open position (see FIG. 6) rotated forward from the closed position around the support shaft 86. In the open position, the gate plate 92 slopes downward from the lower front side of the grass storage container 88 to serve as a chute for guiding the grass clippings to be unloaded from the grass storage container 88.

Since both the dump actuator 98 and the gate actuator 100 are provided in the machine chamber 94, these components can be serviced collectively or at the same time.

The electric chamber 96 is a waterproof and dustproof airtight chamber, and accommodates therein a device control unit 104, a GPS 106 (global positioning system, own position detection unit) for detecting the own position of the riding lawn mower 10 (the container device 70 when detached from the machine main body 20), an undercarriage angle sensor 108 using an acceleration sensor or a gyro sensor for detecting the tilt angle (undercarriage angle) of the undercarriage 78 relative to the horizontal plane, a wireless communication unit 110 for communication with the machine main body 20, a rechargeable battery 112, and a battery state of charge sensor 114 for detecting the remaining battery charge of the battery 112. Thus, the electric devices can be centrally managed in a single location of the electric chamber 96, and the electric wiring for these electric devices can be minimized.

The machine main body 20 is provided with a latch device (coupling unit) 130 for releasably connecting the container device 70 to the rear of the machine main body 20. The latch device 130 includes hook members 132 rotatable about an axis laterally extending in a rear end part of the main frame 22, and a latch actuator 134 including an electric motor for rotating the hook members 132. The gate plate 92 is formed with an engagement openings 136 with which the hook members 132 can be engaged. The latch actuator 134 is controlled by the main body control unit 54.

The hook members 132 can be rotationally driven by the latch actuator 134 between a release position shown in FIG. 1 and a connect position shown in FIG. 2, and are configured to engage the engagement openings 136 (see FIG. 4) as the container device 70 travels forward to the coupling position at the rear of the machine main body 20. Then, the hook members 132 are pivoted to the connect position so that the container device 70 is lifted upward with respect to the machine main body 20 while being connected to the machine main body 20. In this raised state of the container device 70, the front wheels 74 and rear wheels 76 are all lifted from the ground so that the front wheels 74 and rear wheels 76 do not affect the steering and traveling of the machine main body 20. When the container device 70 is connected to the machine main body 20, the grass storage container 88 is in the horizontal position, and the gate plate 92 is in the closed position.

When the container device 70 is connected to the machine main body 20, the device frame 72 is fixed to the main frame 22 via the storage container 88 and the gate plate 92 so as to be immobile in the vertical direction.

When the container device 70 is connected to the machine main body 20, the storage container 88 is disposed horizontally, and the gate plate 92 is closed as shown in FIGS. 1 and 2.

The hook member 132 and the latch actuator 134 serve jointly as a latch device for selectively coupling the machine main body 20 and the container device 70 to each other, and a lift device for upwardly displacing the container device 70 relative to the machine main body 20.

The main frame 22 is provided with a pair of coupling detection switches 138 on either side thereof. Each coupling detection switch detects the positioning of the container device 70 at the coupling position or the position suitable for coupling with the machine main body 20 by being pressed by the gate plate 92. Once both the coupling detection switches 138 have detected that the container device 70 has arrived at the coupling position, the latch actuator 134 rotates the hook members 132 from the release position to the latch position. The coupling detection switches 138 may also be provided on the gate plate 92.

A connection member 140 extends downward from the connection duct 52 at the rear end of the main frame 22. The lower end of the connection member 140 faces the front face of the device frame 72 in the raised state of the container device 70, and a signal line connector 142 is provided between the opposing parts of these two components to connect signal lines of the machine main body 20 with corresponding signal lines of the container device 70. In addition, between the connection member 140 and the device frame 72 is provided a power line connector 144 for connecting the battery 58 to the battery 112 in the raised state of the container device 70.

Figure 7:
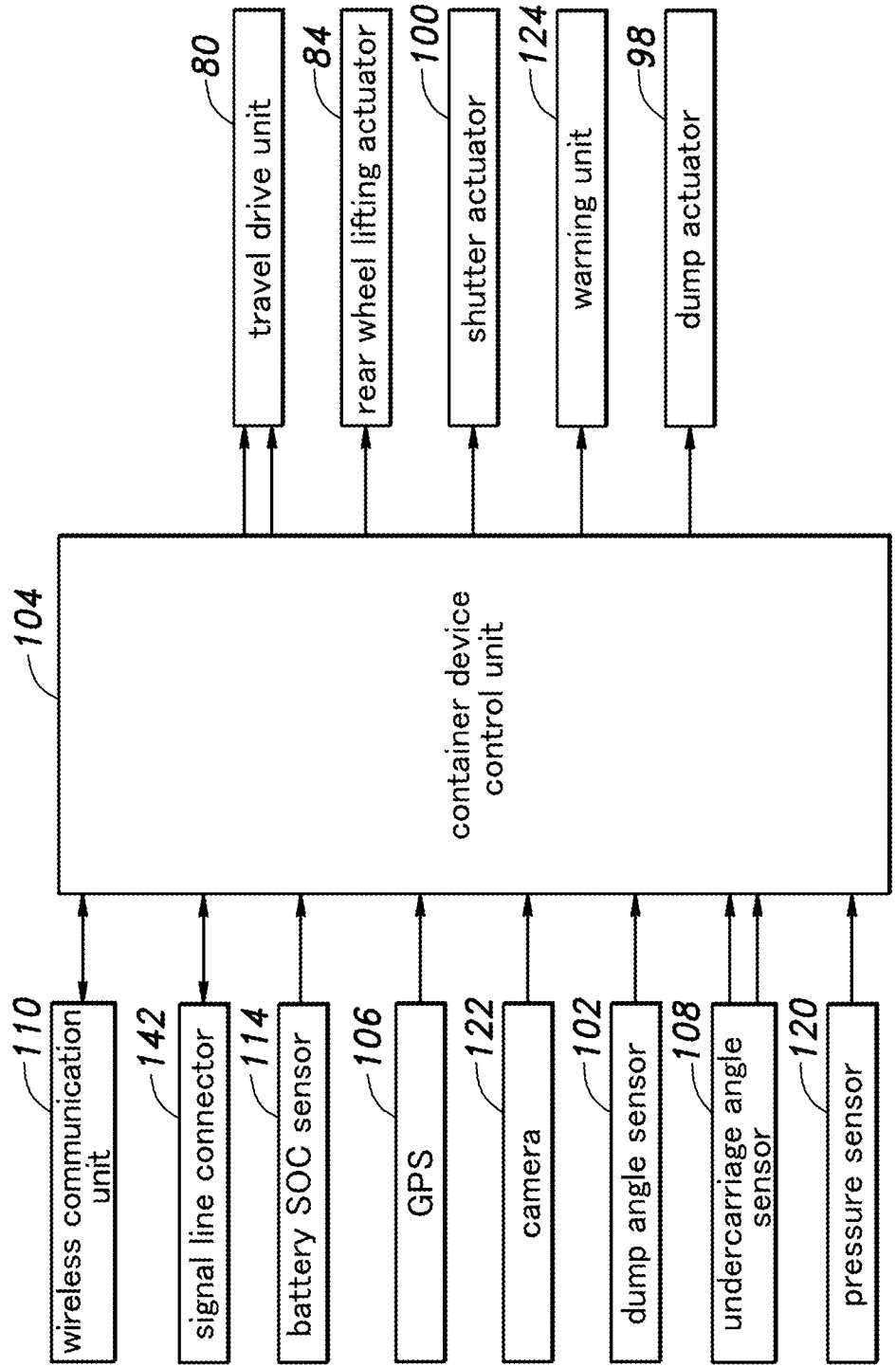
FIG. 7 is a block diagram of a control system of the riding lawn mower according to the present embodiment.

The device control unit 104 is an electronic control device provided with a processor that executes the overall control process for the container device 70 according to a prescribed control program, and other pieces of hardware such as memory. As shown in FIG. 7, the device control unit 104 is configured to receive signals from the dump angle sensor 102, the GPS 106, the undercarriage angle sensor 108, the battery state of charge sensor 114, the pressure sensor 120, and the signal line connector 142, and a video signal from the camera 122 to control the operation of the travel drive unit 80, the rear wheel lifting actuator 84, the gate actuator 100, and the warning unit 124. Further, a wireless communication unit 110 is connected to the device control unit 104.

The device control unit 104 receives the output of the dump angle sensor 102, and detects a container inclination angle $\phi$ which is an angle of the storage container 88 with respect to the device frame 72. Here, the container inclination angle $\phi$ is defined with respect to a horizontal position (0 degree), and the direction in which the inclination angle increases is defined as positive. In addition, the container inclination angle $\phi$ when the storage container 88 is in the inclined position is defined as a dump angle $\phi_D$. In the present embodiment, the dump angle $\phi_D$ is set to 50 degrees.

The device control unit 104 detects a fore and aft vehicle body inclination angle $\theta_L$ defined as an angle of the undercarriage 78 relative to the horizontal plane in the fore and aft direction, and a lateral vehicle body inclination angle $\theta_H$ defined as an angle of the undercarriage 78 relative to the horizontal plane in the lateral direction according to the output from the undercarriage angle sensor 108. Thus, the undercarriage angle sensor 108 functions as an inclination angle sensor for detecting the inclination angle of the undercarriage 78 relative to the horizontal plane. Here, the fore and aft vehicle body inclination angle $\theta_L$ and the lateral vehicle body inclination angle $\theta_H$ are defined in absolute values without making any distinction as to being positive or negative.

The device control unit 104 provides a command for causing the dump actuator 98 to operate at a prescribed driving speed. Here, the driving speed commanded by the device control unit 104 is represented by a percent ratio such that a 100% driving speed corresponds to the maximum driving speed of the dump actuator 98, and the percent ratio is positive when the dump actuator 98 lifts the storage container 88, and negative when the dump actuator 98 lowers the storage container 88.

The battery 112 is a power source for all of the of the electric units of the container device 70 including the travel drive unit 80, and can be charged by the battery 112 via the power line connector 144 while being monitored by the battery state of charge sensor 114.

The mode of operation of the riding lawn mower 10 having the above described configuration is described in the following.

As shown in FIG. 2, the mowing operation is performed while the container device 70 is connected to the machine main body 20 and is raised, and the rear wheels 76 are raised by the rear wheel lifting actuator 84. The machine main body 20 travels by means of the rear wheels 26 that are powered by the internal combustion engine 30. With the clutch 31 engaged, the internal combustion engine 30 rotates the fan 46 and the cutting blade 48. During the mowing operation, the front wheels 74 and the rear wheels 76 of the container device 70 are raised and not grounded so the front wheels 74 and the rear wheels 76 do not impede the traveling and steering of the machine main body 20 of the riding lawn mower 10.

Since the container device 70 is not only raised as a whole relative to the machine main body 20 but also the rear wheels 76 are raised relative to the device frame 72, even when the rear wheels 76 which are the drive wheels are larger in diameter than the front wheels 74, the rear wheels 76 are prevented from touching the ground. Therefore, the necessary lift of the container device 70 as a whole from the machine main body 20 can be minimized.

The grass clippings mowed by the cutting blade 48 are carried by the air flow generated by the rotation of the cutting blade 48 and the fan 46, and are directed from the housing 42 to the connection duct 52 via the discharge duct 50 to be received by the grass receiving chamber 90 via the grass inlet opening 52A. As the mowing operation progresses, the grass clippings stored in the grass receiving chamber 90 increases so that the volume of the exhaust region in the grass receiving chamber 90 decreases in a corresponding manner. The decrease in the volume of the exhaust region in the upper part of the grass receiving chamber 90 causes the inner pressure of the grass receiving chamber 90 to increase.

As the grass clippings stored in the grass receiving chamber reaches a prescribed full level, the inner pressure of the grass receiving chamber 90 detected by the pressure sensor rises to a prescribed level, and this is transmitted to the main body control unit 54 via the signal line connector. The transmission of this signal causes the operation unit 60 to display the need to unload the grass clippings.

When a dump execution button (not shown in the drawings) provided on the operation unit is operated, the travel of the machine main body 20 is stopped, and the clutch 31 is disengaged to stop the rotation of the fan 46 and the cutting blade 48 under the control of the main body control unit 54.

Simultaneously as this stopping operation, the rear wheel lifting actuator 84 lowers the rear wheels, and the latch actuator 134 rotates the hook members 132 to the release position shown in FIG. 1. As a result, the container device 70 is grounded via the front wheels 74 and the rear wheels 76, and is ready for detachment from the machine main body 20 as shown in FIG. 1.

Once the hook members 132 rotate to the release position, the travel drive unit 80 drives the rear wheels 76 so as to cause the container device 70 to move squarely rearward from the machine main body 20 under the control of the device control unit 104. Thus, the container device 70 is detached from the machine main body 20.

Upon completion of this detachment process, the device control unit 104 acquires the own position of the container device from the GPS 106 as a base position, and computes a travel route to a prescribed grass disposal area to which the collected article is transported from the base position. Thereafter, the individual electric motors 82 of the travel drive unit 80 are individually controlled by the device control unit 104 so as to follow the computed travel route. As a result, the container device 70 autonomously travels to the grass disposal area along the travel route by itself as shown in FIG. 4. The turning and other direction changing maneuver of the container device can be effected by varying the rotational speeds of the two electric motors 82 from each other without requiring any special steering device.

Figure 8:
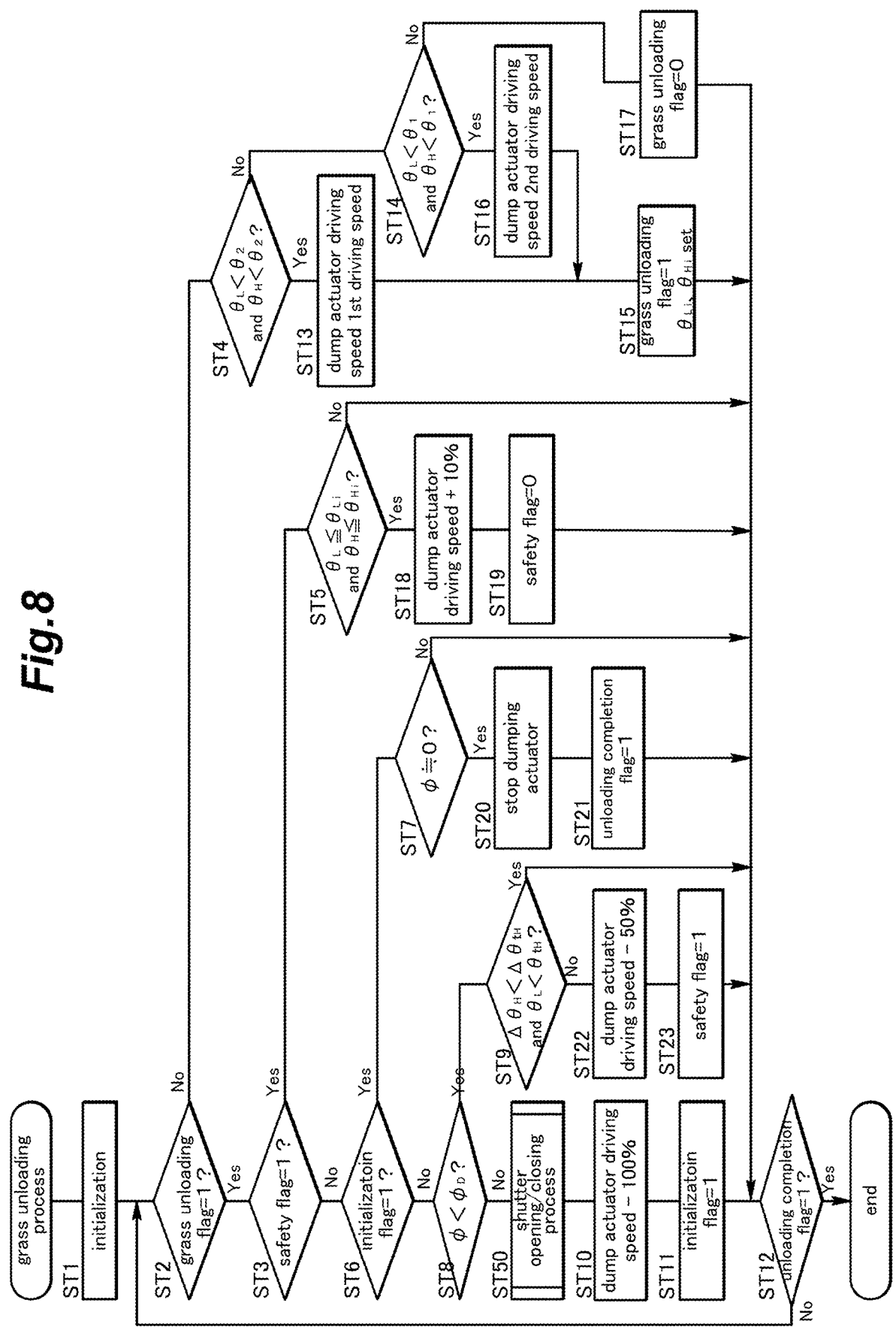
FIG. 8 is a flowchart of a grass clipping unloading process of a device control unit mounted on the riding lawn mower of the present embodiment.

Upon arriving at the grass disposal area, the container device 70 comes to a stop, and the device control unit 104 performs the grass unloading process as shown by the flowchart of FIG. 8.

First of all, in step ST1 of the grass unloading process, the device control unit 104 initializes all of various flags including, a grass unloading flag, a safety flag, an initialization flag, and an unloading completion flag, to zero. After initialization, the device control unit 104 executes step ST2.

In step ST2, the device control unit 104 determines if the grass unloading flag is 1. If it is 1, step ST3 is executed. If it is other than 1, step ST4 is executed.

In step ST3, the device control unit 104 determines if the safety flag is 1. If it is 1, step ST5 is executed, and if it is other than 1, step ST6 is executed.

In step ST6, the device control unit 104 determines if the initialization flag is 1. If it is one, step ST7 is performed, and if it is other than 1, step ST8 is executed.

In step ST8, the device control unit 104 detects the container inclination angle $\phi$, and determines if the container inclination angle $\phi$ is smaller than the dump angle $\phi_D$. If the container inclination angle $\phi$ is smaller than the dump angle $\phi_D$ ($\phi<\phi_D$), step ST9 is executed. If the container inclination angle $\phi$ is equal to or greater than the dump angle $\phi_D$ ($\phi \geq \phi_D$), step ST50 is executed. In the present embodiment, the dump angle $\phi_D$ is set to 50 degrees.

Figure 9:
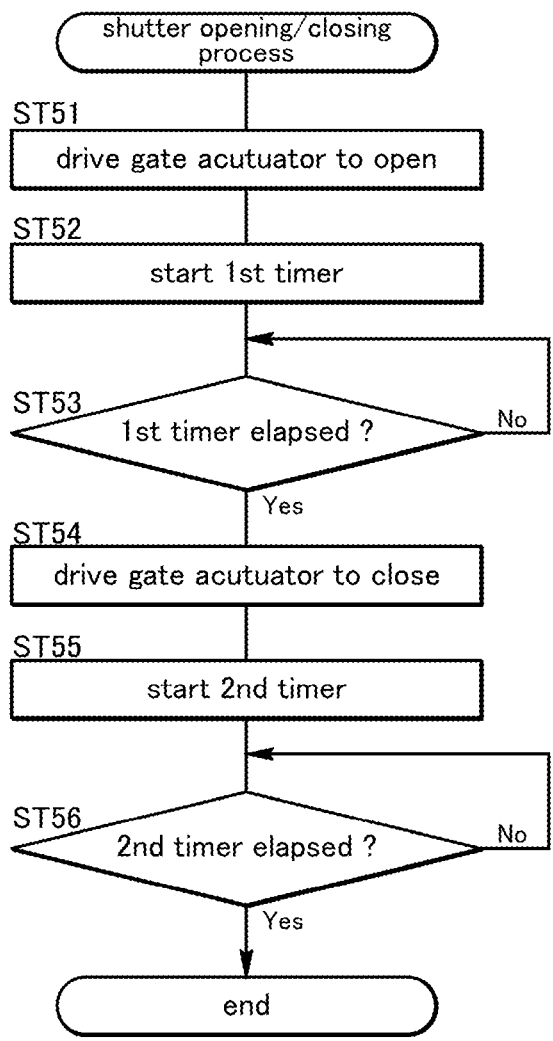
FIG. 9 is a flow chart of a shutter opening and closing process of the device control unit mounted on the riding lawn mower of the present embodiment.

In step ST50, the device control unit 104 performs the shutter opening and closing process shown in the flowchart of FIG. 9. In the shutter opening and closing process, first of all, the device control unit 104 drives the gate actuator 100 to move the gate plate 92 to the open position (ST51). Thereafter, the device control unit 104 starts a first timer (ST 52), and then executes step ST53 to determine the elapsing of a time period that is given as a value greater than a sum of a time period required for the gate plate 92 to open, and a time period required for the grass clippings to be unloaded from the time point of starting the first timer. If this time period has elapsed, step ST54 is executed. Otherwise, the program flow returns to step ST53 to wait for the elapsing of this time period.

In step ST54, the device control unit 104 drives the gate actuator 100 to move the gate plate 92 to the closed position. Thereafter, the device control unit 104 starts a second timer (ST55), and then executes step ST56 to determine the elapsing of a time period that is given as a value greater than a time period required for the gate plate 92 to close from the time point of starting the second timer. If this time period has elapsed in step ST56, the shutter opening and closing process is terminated. Otherwise, the program flow returns to step ST54 to wait for the elapsing of this time period.

When step ST50 (the shutter opening and closing process) is completed, as shown in FIG. 8, the device control unit 104 executes step ST10.

In step ST10, the device control unit 104 drives the dump actuator 98 at a driving speed of −100%. Thereafter, the device control unit 104 executes step ST11.

In step ST11, the device control unit 104 sets the initialization flag to 1. Thereafter, the device control unit 104 executes step ST12.

In step ST12, the device control unit 104 determines if the unloading completion flag is 1. When this flag is not 1, the process returns to step ST2. Otherwise, the grass unloading process is concluded.

If it is determined in step ST2 that the grass unloading flag is not 1, the device control unit 104 executes step ST4. In step ST4, the device control unit 104 detects the fore and aft vehicle body inclination angle $\theta_L$ and the lateral vehicle body inclination angle $\theta_H$. If both the fore and aft vehicle body inclination angle $\theta_L$ and the lateral vehicle body inclination angle $\theta_H$ are smaller than a second inclination angle determination value $\theta_2$, step ST13 is executed. If one of the fore and aft vehicle body inclination angle $\theta_L$ and the lateral vehicle body inclination angle $\theta_H$ is equal to or greater than the second inclination angle determination value $\theta_2$, step ST14 is executed. In the present embodiment, the second inclination angle determination value $\theta_2$ is set to 6 degrees.

In step ST13, the device control unit 104 drives the dump actuator 98 at a first driving speed $v_1$ which is a positive value. In the present embodiment, the first driving speed $v_1$ is set to +70%.

In step ST15, the device control unit 104 sets the grass unloading flag to 1. Further, as in step ST4, the device control unit 104 detects the fore and aft vehicle body inclination angle $\theta_L$ and the lateral vehicle body inclination angle $\theta_H$, and stores them as an initial fore and aft vehicle body inclination angle $\theta_{Li}$ and an initial lateral vehicle body inclination angle $\theta_{Hi}$, respectively. The device control unit 104 then proceeds to step ST12.

In step ST14, the device control unit 104 detects the fore and aft vehicle body inclination angle $\theta_L$ and the lateral vehicle body inclination angle $\theta_H$. It is then determined if both the fore and aft vehicle body inclination angle $\theta_L$ and the lateral vehicle body inclination angle $\theta_H$ are smaller than a first inclination angle determination value $\theta_1$ which is a predetermined angle larger than the second inclination angle determination value $\theta_2$. If smaller, the device control unit 104 executes step ST16. If at least one of the fore and aft vehicle body inclination angle $\theta_L$ and the lateral vehicle body inclination angle $\theta_H$ is equal to or greater than the first inclination angle determination value $\theta_1$, the device control unit 104 executes step ST17. In the present embodiment, the first inclination angle determination value $\theta_1$ is set to 10 degrees.

In step ST16, the device control unit 104 drives the dump actuator 98 at a second driving speed $v_2$ which is a predetermined positive value smaller than the first driving speed $v_1$. In the present embodiment, the second driving speed $v_2$ is set to +50%. Thereafter, the device control unit 104 executes step ST15.

In step ST14, if the device control unit 104 determines that at least one of the fore and aft vehicle body inclination angle $\theta_L$ or the lateral vehicle body inclination angle $\theta_H$ is equal to or greater than the first inclination angle determination value $\theta_1$, the program flow proceeds to step ST17. In step ST17, the device control unit 104 sets the grass unloading flag to 0. Thereafter, the device control unit 104 executes step ST12.

If it is determined in step ST3 that the safety flag is 1, the device control unit 104 executes step ST5. In step ST5, the device control unit 104 detects the fore and aft vehicle body inclination angle $\theta_L$ and the lateral vehicle body inclination angle $\theta_H$, and determines if the fore and aft vehicle body inclination angle $\theta_L$ is equal to or less than the initial fore and aft vehicle body inclination angle $\theta_{Li}$ ($\theta_L \leq \theta_{Li}$), and if the lateral vehicle body inclination angle $\theta_H$ is equal to or less than the initial lateral vehicle body inclination angle $\theta_{Hi}$ ($\theta_H \leq \theta_{Hi}$). The device control unit 104 executes step ST18 if it is determined that $\theta_L \leq \theta_{Li}$ and $\theta_H \leq \theta_{Hi}$, and otherwise executes step ST12.

In step ST18, the device control unit 104 sets the driving speed of the dump actuator 98 to +10%. Thereafter, the device control unit 104 executes step ST19.

In step ST19, the device control unit 104 sets the safety flag to 0. Thereafter, the device control unit 104 executes step ST12.

If it is determined in step ST6 that the initialization flag is 1, the device control unit 104 executes step ST7. In step ST7, the device control unit 104 detects the container inclination angle $\phi$, and determines if the container inclination angle $\phi$ is approximately 0 ($\phi \cong 0$) or if the container inclination angle $\phi$ is equal to or smaller than a predetermined small angle $\delta$. If it is approximately 0 ($\phi \leq \delta$), step ST20 is executed. Otherwise, or if the container inclination angle $\phi$ is greater than the small angle $\delta$ ($\phi > \delta$), step ST12 is executed.

In step ST20, the device control unit 104 stops driving the dump actuator 98. Thereafter, the device control unit 104 executes step ST21.

In step ST21, the device control unit 104 sets the unloading completion flag to 1. Thereafter, the device control unit 104 executes step ST12.

If it is determined in step ST8 that the container inclination angle $\phi$ is smaller than the dump angle $\phi_D$, the device control unit 104 executes step ST9. In step ST9, the device control unit 104 computes the time change rate ($\Delta \theta_L$) of the fore and aft vehicle body inclination angle $\theta_L$ and the time change rate ($\Delta \theta_H$) of the lateral vehicle body inclination angle $\theta_H$ based on the output of the undercarriage angle sensor 108. Here, the time change rates $\Delta \theta_L$ and $\Delta \theta_H$ mean the absolute values of the amounts of change per unit time of the fore and aft body inclination angle $\theta_L$ and the lateral body inclination angle $\theta_H$, respectively. When both the time change rate ($\Delta \theta_L$) of the fore and aft body inclination angle $\theta_L$ and the time change rate ($\Delta \theta_H$) of the lateral body inclination angle $\theta_H$ are smaller than a predetermined time change rate threshold $\Delta \theta_{th}$ ($\Delta \theta_L < \Delta \theta_{th}$ and $\Delta \theta_H < \Delta \theta_{th}$), the device control unit 104 proceeds to step ST12. Otherwise, the device control unit 104 executes step ST22 ($\Delta \theta_L \geq \Delta \theta_{th}$, or $\Delta \theta_H \geq \Delta \theta_{th}$). In the present embodiment, $\Delta \theta_{th}$ is set to 5 degrees per second.

In step ST22, the device control unit 104 sets the driving speed of the dump actuator 98 to −50%. Thereafter, the device control unit 104 executes step ST23.

In step ST23, the device control unit 104 sets the safety flag to 1. Thereafter, the device control unit 104 executes step ST12.

Figure 10:
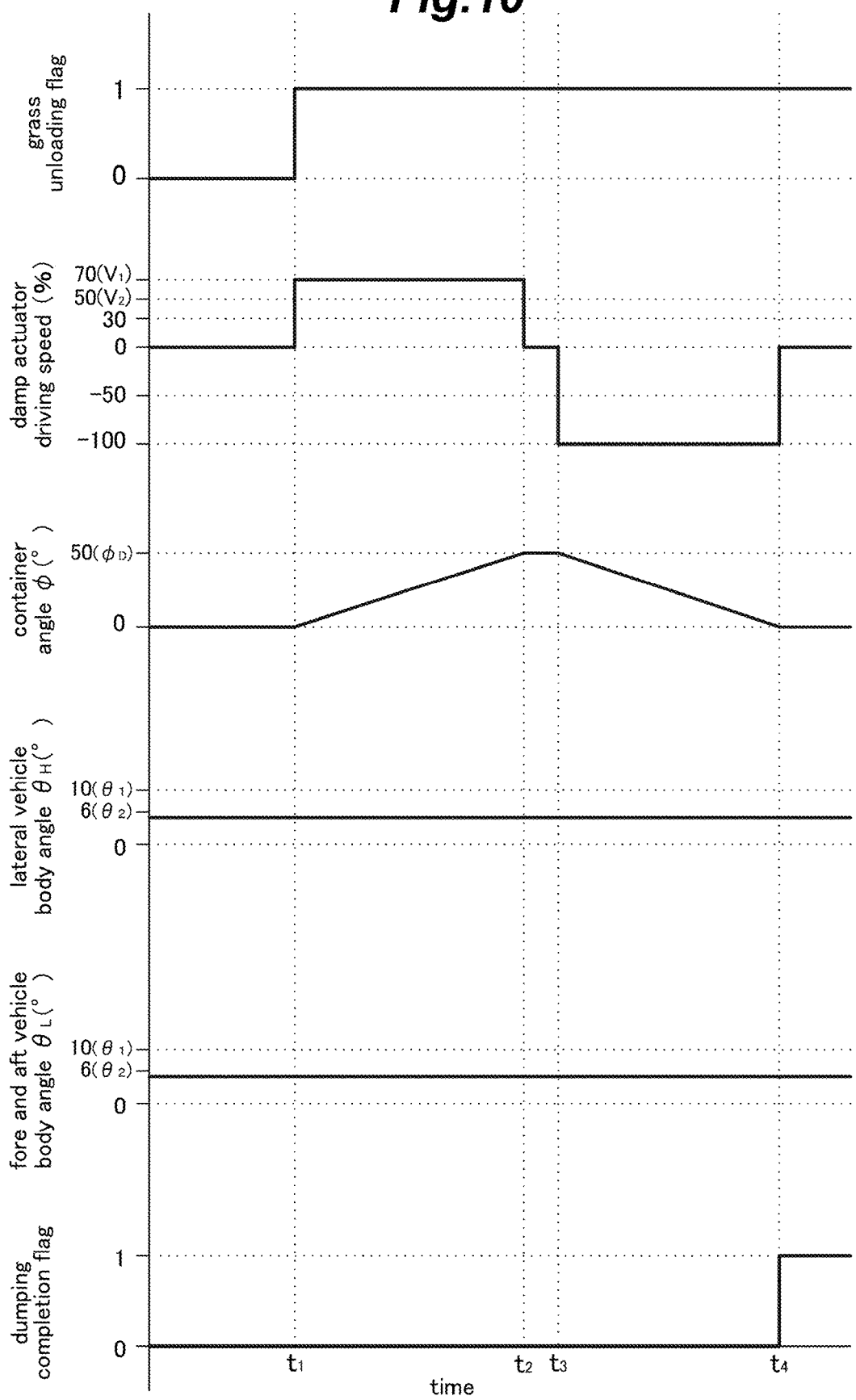
FIG. 10 is a time chart showing the mode of operation of the container device of the present embodiment in a grass clipping disposal area with a relatively small inclination.

With reference to the time chart of FIG. 10, the mode of operation of the grass unloading process performed by the container device 70 will be described in the following. In FIG. 10, the ground at the grass disposal area is stable, and the fore and aft vehicle body inclination angles $\theta_L$ and the lateral vehicle body inclination angles $\theta_H$ are both 5 degrees, and there is no time change of these values.

When the container device 70 arrives at the grass disposal area (time t=$t_1$), the device control unit 104 executes step ST1 and step ST2 one after the other, and then executes step ST4. Since the fore and aft vehicle body inclination angle $\theta_L$ and the lateral vehicle body inclination angle $\theta_H$ are both smaller than the second inclination angle determination value $\theta_2$, the device control unit 104 proceeds to step ST13, and the dump actuator 98 is driven at the first driving speed $v_1$ (+70%). As a result, the dump actuator 98 is driven so as to move the storage container 88 to a tail end up, inclined position. Thereafter, step ST15 is executed, and the device control unit 104 stores the current fore and aft vehicle body inclination angle $\theta_L$ and the current lateral vehicle body inclination angle $\theta_H$ as the initial fore and aft vehicle body inclination angle $\theta_{Li}$ and the current lateral vehicle body inclination angle $\theta_{Hi}$, respectively, before setting the grass disposal flag to 1. Thereafter, the device control unit 104 executes step ST12. At this time, since the unloading completion flag is 0, the device control unit 104 returns to step ST2.

During the course of the process in which the container inclination angle $\phi$ increases to the dump angle $\phi_D$ (50 degrees), and the storage container 88 moves to the inclined position (t=$t_1$ to $t_2$ in FIG. 9), the device control unit 104 cyclically performs steps ST2, ST3, ST6, ST8, ST9 and ST12, in this order.

When the container inclination angle $\phi$ is equal to or greater than the dump angle $\phi_D$ (t=$t_2$), the device control unit 104 determines in step ST8 that the container inclination angle ϕ is equal to or greater than the dump angle $ϕ_D$, and performs the shutter opening and closing process of step ST50. In step ST50, the device control unit 104 initially drives the gate actuator 100 to move the gate plate 92 to the open position. At this time, the grass clippings in the grass receiving chamber 90 are dumped from the content discharge opening 90A to the grass disposal area in front of the container device 70 using the gate plate 92 as a chute. Once a predetermined time has elapsed since the gate actuator 100 started the driving operation, the device control unit 104 starts driving the gate actuator 100 in the reverse direction to move the gate plate 92 to the closed position. Once the gate plate 92 is placed in the closed position, the process of step ST50 is completed ($t=t_3$).

Thereafter, in step ST10, the device control unit 104 sets the driving speed of the dump actuator 98 to −100%, and displaces the storage container 88 toward the horizontal position. Thereafter, in step ST11, the device control unit 104 sets the initialization flag to 1, and after executing step ST12, the control flow returns to step ST2.

After the shutter opening and closing processing is completed, during the time period in which the container inclination angle ϕ becomes equal to 0 degrees ($t=t_3$ to $t_4$ in FIG. 9), the device control unit 104 performs steps ST2, ST3, ST6, ST7, and ST12, in that order.

When the container inclination angle ϕ becomes 0 degrees ($t=t_4$), the device control unit 104 executes steps ST2, ST3, ST6, and ST7 in that order, and then executes step ST20. In step ST20, the device control unit 104 stop driving the dump actuator 98, and then sets the unloading completion flag to 1 in step ST21. Following step ST21, in step ST12, the device control unit 104 determines that the unloading completion flag is 1, and concludes the grass unloading process.

Figure 5:
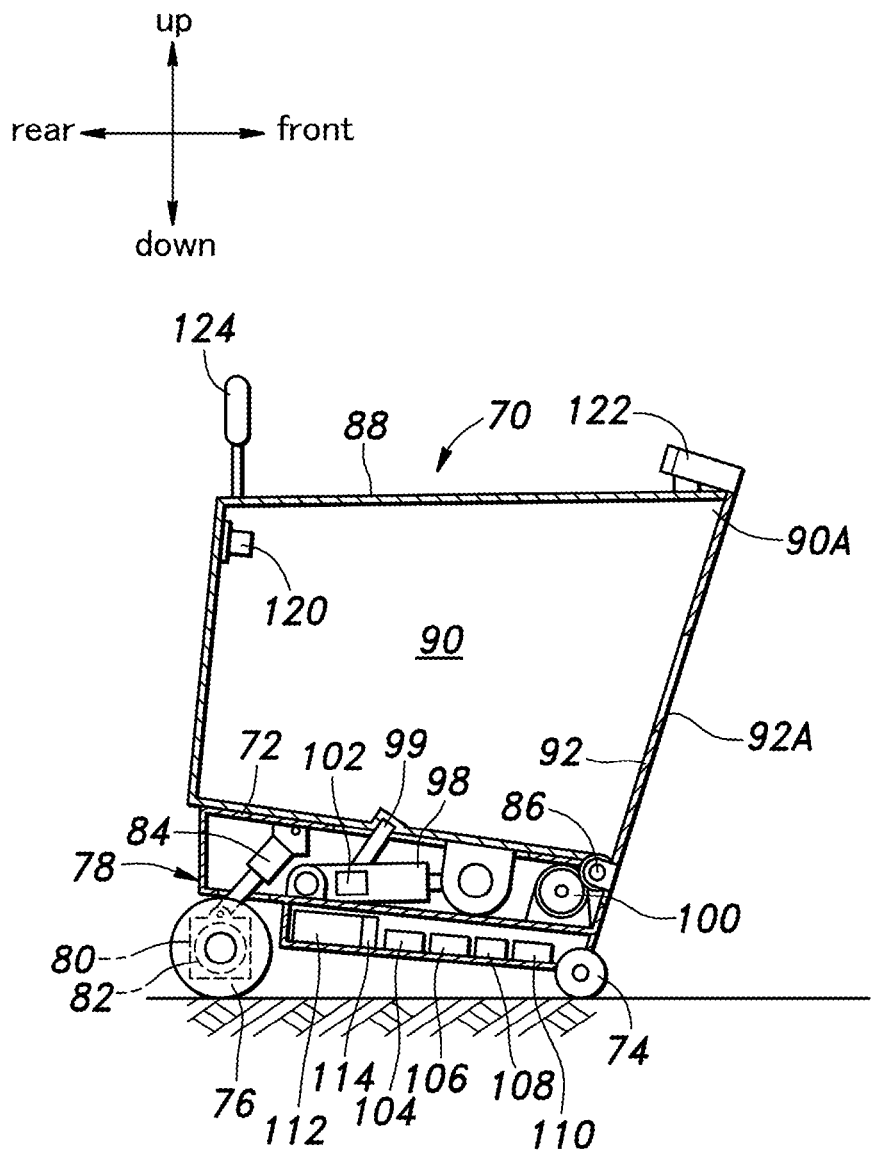
FIG. 5 is a sectional side view of the container device of the riding lawn mower according to the present embodiment when traveling detached from the riding lawn mower.
Figure 6:
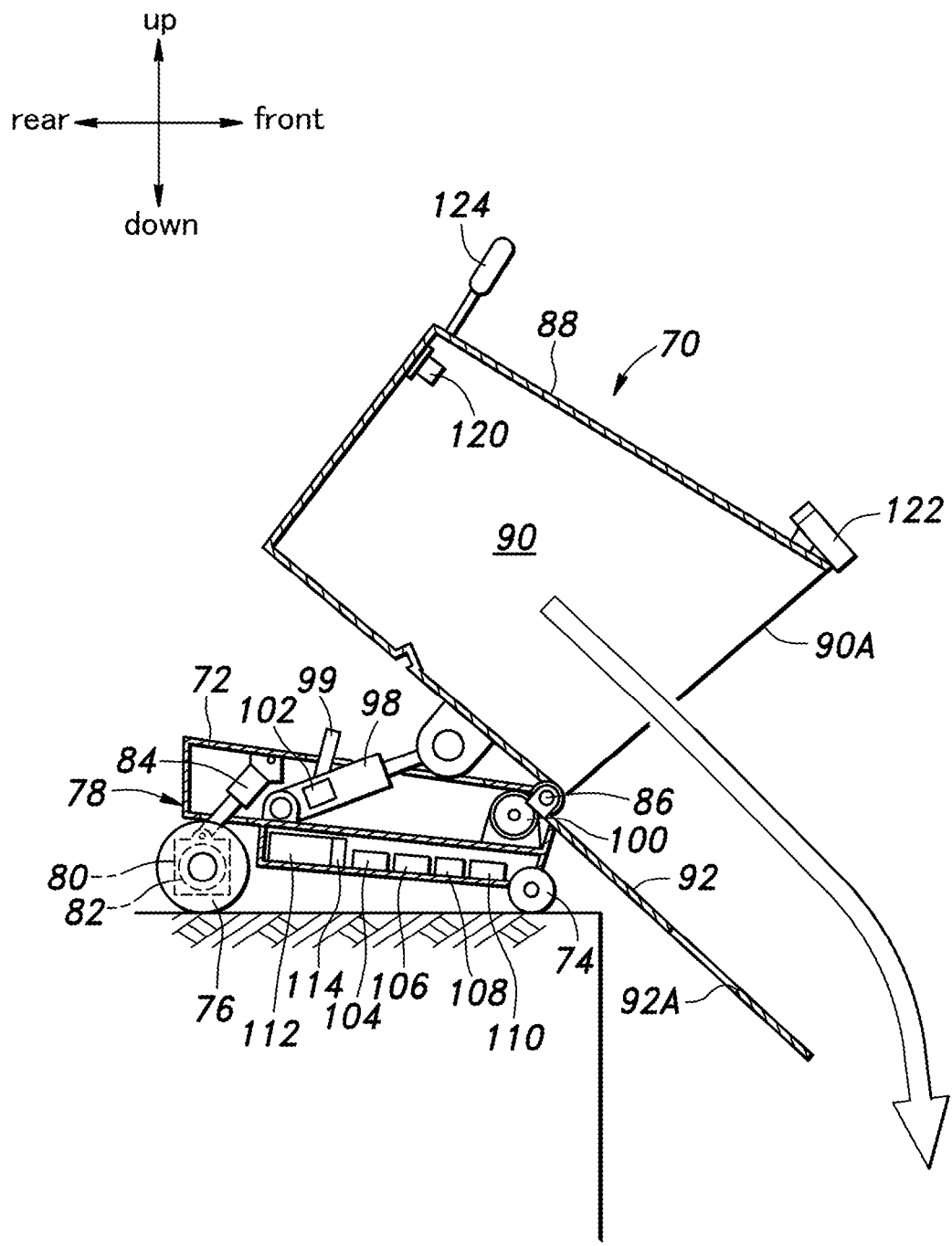
FIG. 6 is a sectional side view of the container device of the riding lawn mower according to the present embodiment when dumping the grass detached from the riding lawn mower.

Thereafter, based on the own position of the container device 70 detected by the GPS 106, the travel drive unit 80 individually drives the right and left rear wheels 76 under the control of the device control unit 104 so as to follow the computed travel route. The container device 70 travels by itself as shown in FIG. 5 autonomously without any human intervention to the base position by following the designated travel route.

As described above, the container device 70 can autonomously travel to and from the grass disposal area without any human intervention.

When the device control unit 104 is traveling autonomously to or back from the grass disposal area, the device control unit 104 monitors the surrounding environment of the container device 70 based on the image signal of the camera 122. When any obstacle or the like is detected on the route, the travel route to or from the grass disposal area is changed so as to avoid a collision with the obstacle or the like. Thereby, a collision between the container device 70 and the obstacle or the like is avoided in advance. The image signal of the camera 122 is transmitted to the wireless communication unit 56 of the machine main body 20 by the wireless communication unit 110 of the device control unit 104, and the surrounding environment of the container device 70 may be displayed on the operation unit 60.

Once the container device 70 returns to the base position, the container device 70 moves forward by a predetermined distance from directly behind the machine main body 20. When the coupling detection switch 138 is pushed by the forward movement of the container device 70, the latch actuator 134 is driven under the control of the main body control unit 54 to rotate the hook members 132 from the release position to the latch position. Under the control of the device control unit 104, the rear wheel lifting actuator 84 is driven to move the rear wheels 76 to the raised position. As a result, as shown in FIG. 2, the container device 70 returns to the connected and raised state relative to the machine main body 20 so that the mowing can be resumed.

Figure 11:
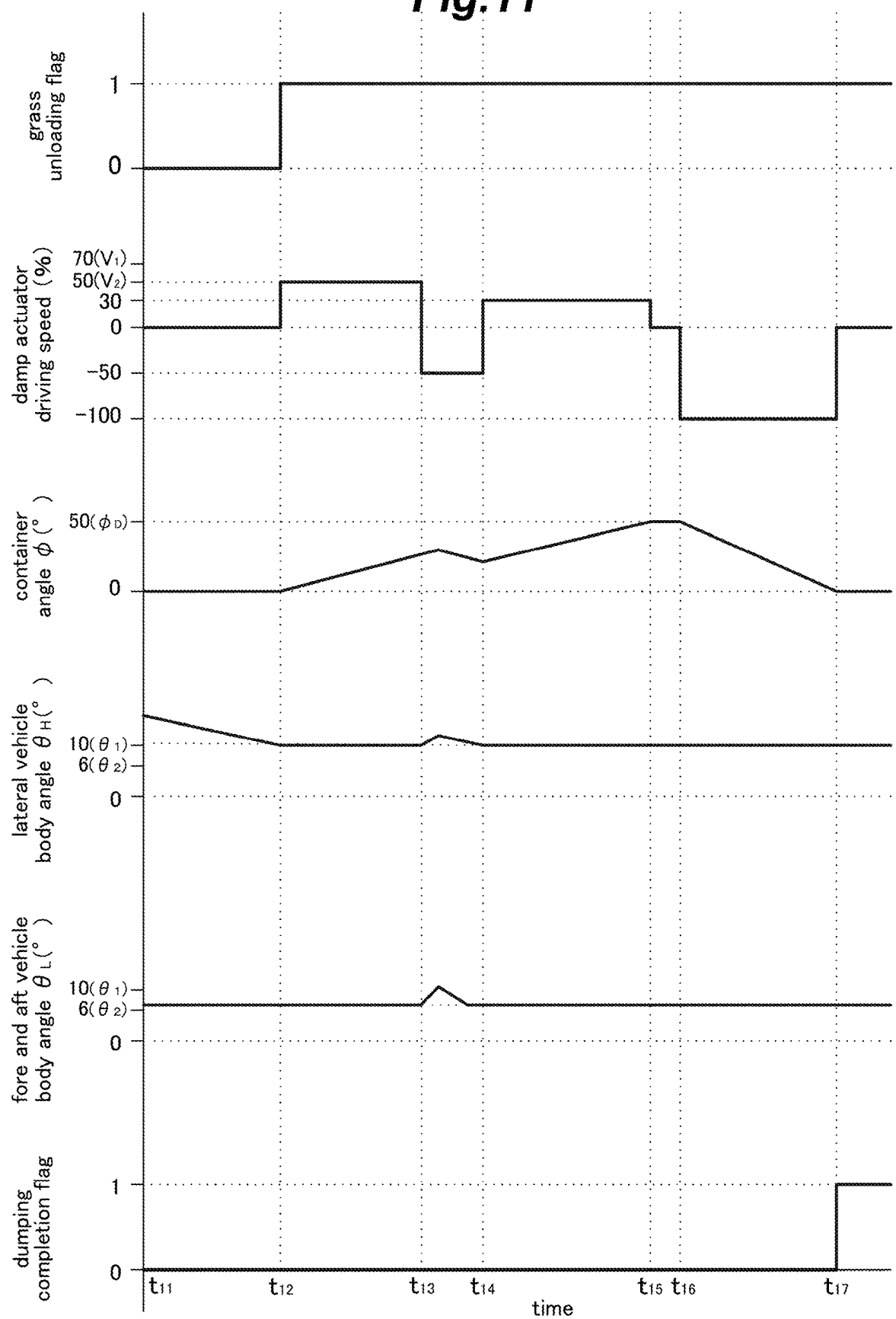
FIG. 11 is a time chart showing the mode of operation of the container device of the present embodiment in a grass clipping disposal area with a significant and unstable inclination.

Next, referring to FIG. 10 and FIG. 11, the effect of the riding lawn mower 10 is discussed in the following in conjunction with the situation where the grass disposal area is located on a relatively steep and unstable slope as shown in FIG. 11.

As shown in FIG. 11, suppose that the container device 70 is on a steep slope where either the fore and aft vehicle body inclination angle $θ_L$ or the lateral vehicle body inclination angle $θ_H$ is equal to or greater than the first inclination angle determination value $θ_1$ ($t=t_{11}$ to $t_{12}$, for instance). In this case, following step ST2, the device control unit 104 determines in step ST4 that the fore and aft vehicle body inclination angle $θ_L$, or the lateral vehicle body inclination angle $θ_H$ is equal to or greater than the second inclination angle determination value $θ_2$, and executes step ST14. In step ST14, it is determined that the fore and aft vehicle body inclination angle $θ_L$ or the lateral vehicle body inclination angle $θ_H$ is greater than the first inclination angle determination value $θ_1$, and step ST17 is executed. In step ST17, the device control unit 104 sets the grass unloading flag to 0, and then executes step ST12 before returning to step ST2.

As described above, when either the fore and aft vehicle body inclination angle $θ_L$ or the lateral vehicle body inclination angle $θ_H$ is equal to or greater than the first inclination angle determination value $θ_1$, the device control unit 104 repeats steps ST2, ST4, ST14, ST17, and ST12 in that order, and the dump actuator 98 is not driven. Since the driving of the dump actuator 98 is prohibited on a slope where the fore and aft vehicle body inclination angle $θ_L$ or the lateral vehicle body inclination angle $θ_H$ is equal to or greater than the first inclination angle determination value $θ_1$, and the container device 70 may therefore tip over if the dump actuator 98 is driven, the container device 70 is prevented from tipping over.

As shown in FIG. 11, it is possible that either the fore and aft vehicle body inclination angle $θ_L$ or the lateral vehicle body inclination angle $θ_H$ is equal to or greater than the second inclination angle determination value $θ_2$, and both the fore and aft vehicle body inclination angle $θ_L$ and the lateral vehicle body inclination angle $θ_H$ are smaller than the first inclination angle determination value $θ_1$ ($t=t_{12}$ to $t_{13}$, for example). In such a case, first, after executing step ST2, the device control unit 104 determines in step ST4 that the fore and aft vehicle body inclination angle $θ_L$, or the lateral vehicle body inclination angle $θ_H$ is equal to or greater than the second inclination angle determination value $θ_2$, and execute ST14. In step ST14, it is determined that the fore and aft vehicle body inclination angle $θ_L$ and the lateral vehicle body inclination angle $θ_H$ are both smaller than the first inclination angle determination value $θ_1$, and step ST16 is executed. In step ST16, the driving speed of the dump actuator 98 is set to the second driving speed $v_2$ (+50%), and then step ST15 is executed. In step ST15, the device control unit 104 stores the initial fore and aft vehicle body inclination angle $θ_{Li}$ and the initial lateral vehicle body inclination angle $θ_{Hi}$, and sets the grass unloading flag to 1. After these processes are completed, the device control unit 104 executes step ST12.

After executing step ST12, the device control unit 104 executes step ST2. It is then determined that the grass unloading flag is 1, and the process flow proceeds to steps ST3, ST6, and ST8, and then to step ST9. In step ST9, if it is determined that the time change rates of the fore and aft vehicle body inclination angle $\theta_L$ and the lateral vehicle body inclination angle $\theta_H$ are both equal to or less than the time change rate threshold $\Delta\theta th$ ($\Delta\theta_L \leq \Delta\theta_{th}$ and $\Delta\theta_H \leq \Delta\theta_{th}$), the process flow proceeds to step ST12. Therefore, as long as the time change rates of the fore and aft vehicle body inclination angle $\theta_L$ and the lateral vehicle body inclination angle $\theta_H$ are both equal to or less than the time change rate threshold $\Delta\theta th$, and until the container inclination angle $\phi$ reaches the dump angle $\phi_D$, steps ST2, ST3, ST6, ST7 and ST12 are repeated. At this time, the dump actuator 98 is driven at the second driving speed $v_2$ (+50%) set in step ST16 (t=$t_{12}$ to $t_{13}$). On the other hand, as shown in time t=$t_1$ to $t_2$ in FIG. 10, when the fore and aft vehicle body inclination angle $\theta_L$ and the lateral vehicle body inclination angle $\theta_H$ are smaller than the second inclination angle determination value $\theta_2$, the dump actuator 98 operates at the first driving speed $v_1$ (+70%).

When the container device 70 is on a steep slope (FIG. 11), the driving speed of the dump actuator 98 is the second driving speed $v_2$. On the other hand, when the container device 70 is on a gentle slope (FIG. 10), the driving speed is the first driving speed $v_1$. Therefore, when the container device 70 is located on a steep slope, the time change rate of the container inclination angle $\phi$ is small, and the grass storage container 88 is slowly tilted relative to the device frame 72 so that the container device 70 is prevented from tipping over. Since the driving speed of the dump actuator 98 is great on a slope having a gentle slope where there is a low risk of tipping over, the storage container 88 tilts quickly so that the dumping processing is performed in a relatively short period of time.

When the grass storage container 88 is tilted, the sloped ground under the container device 70 may depress or collapse due to the shifting of the center of gravity of the container device 70 or the like, and this creates a high risk for the container device 70 to tip over.

FIG. 11 shows the case where the time change rate $\Delta\theta_L$ of the fore and aft vehicle body inclination angle $\theta_L$ becomes greater than the time change rate threshold $\Delta\theta th$ (t=$t_{13}$) while the container inclination angle $\phi$ is increasing. In such a case, the device control unit 104 determines that the time change rate $\Delta\theta_L$ is greater than the time change rate threshold $\Delta\theta th$ in step ST9, and executes step ST22. In step ST22, the device control unit 104 sets the driving speed of the dump actuator 98 to −50% so that the container inclination angle $\phi$ starts decreasing (t=$t_{13}$ to $t_{14}$) following the execution of step ST22.

When the time change rate $\Delta\theta_L$ exceeds the time change rate threshold $\Delta\theta th$, the slope on which the container device 70 is located may become unstable due to the driving of the dump actuator 98 which may create a risk of causing a depression or a collapse of the ground under the container device 70. In such a case, since the device control unit 104 drives the dump actuator 98 in the direction in which the container inclination angle $\phi$ decreases, the center of gravity of the container device 70 moves to a position where the center of gravity was before the dump actuator 98 was driven. Therefore, the container device 70 is prevented from tipping over.

At this time, the driving speed of the dump actuator 98 is set to −50%, and the absolute value thereof is smaller than the first driving speed $v_1$ (+70%). Therefore, the absolute value of the driving speed of the dump actuator 98 when driving in the reverse direction on the unstable slope is greater than the absolute value of the first driving speed $v_1$ which is the driving speed on the slope with a small inclination (see FIG. 10, for example) so that the grass storage container 88 is displaced at a low speed, and the container device 70 is prevented from tipping over.

Following step ST22, the device control unit 104 executes step ST23, and sets the safety flag to 1. Thereafter, the device control unit 104 sequentially executes steps ST12 and ST2, determines that the safety flag is 1 in step ST3, and proceeds to step ST5. In step ST5, it is determined that the fore and aft body inclination angle $\theta_L$ is equal to or smaller than the initial fore and aft body inclination angle $\theta_{Li}$ stored in step ST15 ($\theta_L \leq \theta_{Li}$), and the lateral body inclination angle $\theta_H$ is equal to or smaller than the initial lateral body inclination angle $\theta_{Hi}$ also stored in step ST15 ($\theta_H \leq \theta_{Hi}$). Otherwise ($\theta_L > \theta_{Li}$ or $\theta_H > \theta_{Hi}$), the device control unit 104 executes step ST12. Therefore, the device control unit 104 performs steps ST2, ST3, and so on until the fore and aft body inclination angle $\theta_L$ becomes equal to or smaller than the initial fore and aft body inclination angle $\theta_{Li}$, and the lateral body inclination angle $\theta_H$ becomes less than or equal to the initial lateral body inclination angle $\theta_{Hi}$. It is repeatedly executed in the order of ST5 and ST12.

By driving the dump actuator 98 in the direction to decrease the container inclination angle $\phi$ in this manner, the fore and aft vehicle body inclination angle $\theta_L$ may become equal to or smaller than the initial fore and aft vehicle body inclination angle $\theta_{Li}$, and the lateral vehicle body inclination angle $\theta_H$ may become equal or smaller than the initial lateral vehicle body inclination angle $\theta_{Hi}$ as shown at time t=$t_{14}$ in FIG. 11.

At this time, in step ST5, the device control unit 104 determines that the fore and aft vehicle body inclination angle $\theta_L$ is equal to or smaller than the initial fore and aft vehicle body inclination angle $\theta_{Li}$ ($\theta_L \leq \theta_{Li}$), and the lateral vehicle body inclination angle $\theta_H$ is equal to or smaller than the initial lateral vehicle body inclination angle $\theta_{Hi}$ ($\theta_H \leq \theta_{Hi}$). In step ST18, the driving speed of the dump actuator 98 is set to +10%. As a result, as shown in FIG. 11, the container inclination angle $\phi$ starts increasing (t=$t_{14}$ to $t_{15}$).

After executing step ST18, the device control unit 104 executes step ST19, and sets the safety flag to 0. Thereafter, as long as the time change rates of the fore and aft body inclination angle and the lateral body inclination angle do not exceed the time change rate threshold $\Delta\theta th$, the device control unit 104 repeatedly executes steps ST12, ST2, ST3, ST6, ST8 and ST9 in that order until the container inclination angle $\phi$ reaches the dump angle $\phi_D$ (t=$t_{15}$).

Further, once the container inclination angle $\phi$ reaches the dump angle $\phi_D$, the device control unit 104 executes step ST8, and then executes step ST50. In step ST50, the gate plate 92 is opened, and the grass clippings are discharged from the grass receiving chamber 90. Following step ST50, the driving speed of the dump actuator 98 is set to −100% in step ST10, and the storage container 88 returns to the horizontal position (t=$t_{17}$).

Thus, once the fore and aft body inclination angle $\theta_L$ and the lateral body inclination angle $\theta_H$ change such that the fore and aft body inclination angle $\theta_L$ is equal to or smaller than the initial fore and aft body inclination angle $\theta_{Li}$ ($\theta_L \leq \theta_{Li}$), and the lateral body inclination angle $\theta_H$ is equal to or smaller than the initial lateral vehicle body inclination angle $\theta_{Hi}$ ($\theta_H \leq \theta_{Hi}$), the dump actuator 98 drives the storage container 88 to an inclined position that allows the grass clippings to be unloaded. Therefore, the grass clippings can be unloaded in a reliable manner.

As shown in FIGS. 10 and 11, when both the fore and aft vehicle body inclination angle $\theta_L$ and the lateral vehicle body inclination angle $\theta_H$ are smaller than the first inclination angle determination value $\theta_1$, dumping of grass clippings is performed until the container inclination angle $\phi$ becomes equal to the dump angle $\phi_D$. The storage container 88 is tilted with respect to the device frame 72 to discard the grass clippings. Therefore, when the container device 70 is located on a gentle slope posing a low risk of tipping over, the grass clippings can be unloaded in a relatively short period of time.

After the shutter opening and closing process of step ST50 is performed, the device control unit 104 sets the driving speed of the dump actuator 98 to −100% in step ST10, and drives the dump actuator 98 at the highest speed (t=$t_3$ to $t_4$ in FIG. 10, and t=$t_{16}$ to $t_{17}$ in FIG. 11). Thus, the time required for the storage container 88 to return from the inclined position to the horizontal position after unloading the grass clippings is shortened so the time required to complete the unloading of the grass clippings can be minimized.

The present invention has been described in terms of a specific embodiment, but is not limited by such an embodiment, and can be modified in various ways without departing from the spirit of the present invention.

In the above embodiment, the fore and aft vehicle body inclination angle $\theta_L$ and the lateral vehicle body inclination angle $\theta_H$ were used in step ST4, but it is also possible to select the greater of the two as the vehicle body inclination angle $\theta$ to be compared with the second inclination angle determination value $\theta_2$ in the determination process. Similarly, in step ST14, the greater of the fore and aft vehicle body inclination angle $\theta_L$ and the lateral vehicle body inclination angle $\theta_H$ may be compared with the first inclination angle determination value $\theta_1$.

In the above embodiment, step ST22 was performed immediately following the determination process in step ST9 comparing the time change rate $\Delta\theta_L$ of the fore and aft body inclination angle $\theta_L$ or the time change rate $\Delta\theta_H$ of the lateral body inclination angle $\theta_H$ with the time change rate threshold $\Delta\theta_{th}$. However, it is also possible to stop the drive of the dump actuator 98 for a prescribed time period before executing step ST2. By stopping the dump actuator 98 when the container device 70 is on an unstable slope where the inclination may change due to the driving of the dump actuator 98, the driving of the dump actuator 98 may be stopped until the slope becomes stable so that the container device 70 may be prevented from tipping over.

In the above embodiment, the inclination angle of the vehicle body and the slope were determined by using the fore and aft vehicle body inclination angles $\theta_L$ and the lateral vehicle body inclination angles $\theta_H$ in steps ST4 and ST14. However, the direction for measuring the inclination angle is not limited by this example. By measuring the inclination angle of the undercarriage 78 in the fore and aft direction and the lateral direction, the inclination angle of the slope can be determined with ease, and the processing performed by the device control unit 104 can be simplified.

In addition, in the case where the gravitational center of the container device 70 shifts in the direction of unloading the grass clippings, and this shifting of the gravitational center may cause the container device 70 to tip over, the inclination angle of the container device 70 in this direction may be used in steps ST4 and ST14. For instance, in the case where the container device 70 unloads the grass clippings forward as was the case with the illustrated embodiment, the determination process may be based on the fore and aft vehicle body inclination angles $\theta_L$. Thereby, the determination process by the device control unit 104 can be simplified.

Further, in the shutter opening and closing process, the timing at which the gate plate 92 is closed may be set by monitoring the unloading state of the grass clippings based on the image signal (captured image) of the camera 122.

In the case where the device control unit 104 stops traveling due to any failure or obstacle in the travel route to or from the grass disposal area, or any failure in the dumping operation of the grass storage container 88 or the operation of the gate plate 92, the user may be warned by the lighting or activation of the warning unit 124.

The image signal of the camera 122 is transmitted to the wireless communication unit 56 of the machine main body 20 by the wireless communication unit 110 of the device control unit 104, and the surrounding environment of the device control unit 104 is displayed on the operation unit 60. In this case, it is also possible to remotely control the container device 70 via wireless communication from the machine main body 20 based on the screen display of the surrounding environment of the device control unit 104.

In the foregoing embodiment, the tipping over of the container device 70 of the riding lawn mower 10 was prevented. However, the present invention is applicable not only to such a container device 70 for a riding lawn mower 10, but also to a riding lawn mower 10 undetachably fitted with a grass storage container 88, and configured to unload the grass clippings by tilting the grass storage container 88. Also, the foregoing embodiment was directed to a riding lawn mower 10, but may also be applied to work equipment other than a lawn mower such as a road sweeper and a harvesting agricultural machine.

GLOSSARY OF TERMS

10: riding lawn mower (work equipment)
72: device frame (vehicle body)
88: grass storage container (storage container)
104: device control unit (control unit)
108: undercarriage angle sensor (inclination angle sensor)

The invention claimed is:
1. Work equipment, comprising:
  a vehicle body;
  a storage container provided on the vehicle body so as to be moveable between a horizontal position for storing a collected article and an inclined position for unloading the collected article;
  a drive unit provided between the vehicle body and the storage container and configured to change a container inclination angle defined as an angle of the storage container with respect to the vehicle body;
  an inclination angle sensor configured to detect a vehicle body inclination angle defined as an inclination angle of the vehicle body with respect to a horizontal plane; and
  a control unit configured to control a driving operation of the drive unit, the control unit controlling the drive unit according to the vehicle body inclination angle,
  wherein, when the drive unit is performing the driving operation to increase the container inclination angle, and a time change rate of the vehicle body inclination angle exceeds a predetermined threshold value, the control unit causes the drive unit to decrease the container inclination angle.
2. The work equipment according to claim 1, wherein the control unit prohibits the driving operation of the drive unit when the vehicle body inclination angle is equal to or greater than a first inclination angle determination value.

3. The work equipment according to claim 2, wherein the control unit changes a driving speed of the drive unit in dependence on the vehicle body inclination angle.

4. The work equipment according to claim 3, wherein when the vehicle body inclination angle is smaller than a second inclination angle determination value smaller than the first inclination angle determination value, the control unit sets the driving speed of the drive unit to a predetermined first driving speed, and when the vehicle body inclination angle is equal to or greater than the second inclination angle determination value and smaller than the first inclination angle determination value, the control unit sets the driving speed of the drive unit to a predetermined second driving speed lower than the first driving speed.

5. The work equipment according to claim 1, wherein when the drive unit is performing the driving operation to increase the container inclination angle, and the time change rate of the vehicle body inclination angle exceeds the predetermined threshold value, the control unit causes the drive unit to decrease the container inclination angle at a driving speed equal to or lower than the first driving speed.

6. The work equipment according to claim 5, wherein when the control unit causes the drive unit to perform the driving operation so as to decrease the container inclination angle following an event where the time change rate of the vehicle body inclination angle has exceeded the predetermined threshold value, the control unit causes the drive unit to perform the driving operation so as to increase the container inclination angle upon the vehicle body inclination angle becoming equal to or smaller than the first inclination angle determination value.

7. The work equipment according to claim 3, wherein when the vehicle body inclination angle is equal to or smaller than the first inclination angle determination angle, the control unit causes the drive unit to perform the driving operation until the container inclination angle has become equal to a prescribed angle.

8. The work equipment according to claim 7, wherein when the control unit causes the drive unit to perform the driving operation so as to decrease the container inclination angle following an event where the storage container has been moved to the inclined position, the control unit causes the drive unit to perform the driving operation at a maximum speed.

9. The work equipment according to claim 1, wherein the vehicle body inclination angle comprises a fore and aft inclination angle defined as an angle in a fore and aft direction of the vehicle body relative to a horizontal plane, and a lateral inclination angle defined as an angle in a lateral direction relative to the horizontal plane.

10. The work equipment according to claim 1, wherein the vehicle body inclination angle comprises an inclination angle defined as an angle in a tilting direction of the storage container tilted by the drive unit relative to a horizontal plane of the vehicle body.

11. The work equipment according to claim 2, wherein the vehicle body inclination angle comprises a fore and aft inclination angle defined as an angle in a fore and aft direction of the vehicle body relative to a horizontal plane, and a lateral inclination angle defined as an angle in a lateral direction relative to the horizontal plane.

12. The work equipment according to claim 2, wherein the vehicle body inclination angle comprises an inclination angle defined as an angle in a tilting direction of the storage container tilted by the drive unit relative to a horizontal plane of the vehicle body.

13. The work equipment according to claim 3, wherein the vehicle body inclination angle comprises a fore and aft inclination angle defined as an angle in a fore and aft direction of the vehicle body relative to a horizontal plane, and a lateral inclination angle defined as an angle in a lateral direction relative to the horizontal plane.

14. The work equipment according to claim 3, wherein the vehicle body inclination angle comprises an inclination angle defined as an angle in a tilting direction of the storage container tilted by the drive unit relative to a horizontal plane of the vehicle body.

* * * * *